United States Patent
Sandquist

(10) Patent No.: US 10,445,405 B2
(45) Date of Patent: Oct. 15, 2019

(54) METHOD OF PERFORMING VARIANCE CALCULATIONS IN REAL-TIME FOR IN-SITU INSTANT VARIANCE MEASUREMENTS FOR LOW POWER APPLICATIONS

(71) Applicant: Honeywell International Inc., Morris Plains, NJ (US)

(72) Inventor: David Sandquist, Saint Paul, MN (US)

(73) Assignee: Honeywell International Inc., Morris Plains, NJ (US)

( * ) Notice: Subject to any disclaimer, the term of this patent is extended or adjusted under 35 U.S.C. 154(b) by 246 days.

(21) Appl. No.: 15/414,967

(22) Filed: Jan. 25, 2017

(65) Prior Publication Data

US 2018/0210863 A1    Jul. 26, 2018

(51) Int. Cl.
*G06F 17/18* (2006.01)

(52) U.S. Cl.
CPC .................................. *G06F 17/18* (2013.01)

(58) Field of Classification Search
None
See application file for complete search history.

(56) References Cited

FOREIGN PATENT DOCUMENTS

CN          103575982 A  *  2/2014

OTHER PUBLICATIONS

Galleani, "The Dynamic Allan Variance II: A Fast Computational Algorithm" IEEE Transactions on Ultrasonics, Ferroelectrics, and Frequency Control, vol. 57, No. 1, Jan. 2010 (Year: 2010).*
Ng et al., "Characterization of Ring Laser Gyro Performance Using the Allan Variance Method" J. Guidance, vol. 20, No. 1: Engineering Notes, 1997 (Year: 1997).*
Kuboki et al., "An Allan Variance Real-Time Processing System for Frequency Stability Measurements of Semiconductor Lasers" IEEE Transactions on Instrumentation and Measurement, vol. 39, No. 4, Aug. 1990 (Year: 1990).*
Wang et al., "The Fast algorithm of the dynamic Allan variance for gyroscopes" Optik 127 (2016) 2413-2418 (Year: 2016).*

(Continued)

*Primary Examiner* — John C Kuan
(74) *Attorney, Agent, or Firm* — Fogg & Powers LLC

(57) ABSTRACT

A system for performing real-time variance analysis of data measurements comprises a data source, and a data processing unit in operative communication with the data source. The data processing unit is configured to receive data measurement values output from the data source and comprises a processor, and a memory device that includes instructions executable by the processor for a real-time algorithm that performs variance calculations for the data measurement values. The real-time algorithm performs a process comprising: initializing a data array for tracking a variance of individual data measurement values received from the data source; receiving a data measurement value from the data source; determining the number of averaging times to be recalculated; and repeating the process when the next data measurement value is received from the data source. The data processing unit is configured to output real-time variance measurements based on the variance calculations for the data measurement values.

20 Claims, 5 Drawing Sheets

(56) References Cited

OTHER PUBLICATIONS

Allen, "Picosecond Time Difference Measurement System", May 1975, pp. 404-411, Publisher: Proc. 29th Annual Symposium on Frequency Control.
Allan, "Introduction to Time-Domain Measurement Standards", pp. 1-53, Publisher: Allan's TIME, Inc., 35th Annual Time and Frequency Metrology Seminar, Jun. 2010, Boulder, CO.
Allan et al., "The Science of Timekeeping Application Note 1289", Jun. 1997, pp. 1-88, Publisher: Hewlett-Packard Company.
Howe, "Methods of Improving the Estimation of Long-Term Frequency Variance", "Time & Frequency Div.", Mar. 1997, pp. 1-5, Publisher: National Institute of Standards & Technology, Published in: Boulder, CO.
Howe, "Interpreting Oscillatory Frequency Stability Plots", pp. 725-732, Publisher: 2002 IEEE International Frequency Control Symposium and PDA Exhibition, Published in: Boulder, CO.
Riley, "Techniques for Frequency Stability Analysis", "Symmetricom", May 4, 2003, pp. 1-92, Publisher: IEEE International Frequency Control Symposium, Published in: Tampa, FL.
Riley, "Confidence Intervals and Bias Corrections for the Stable32 Variance Functions", Aug. 2, 2003, pp. 1-8, Publisher: Hamilton Technical Services.
Vanier et al., "Time Domain Measurement of Frequency Stability", "Proceedings of the Tenth Annual Precise Time and Time Interval (PTTI) Applications and Planning Meeting", Nov. 28, 1978, pp. 1-46, Publisher: NASA Goddard Space Flight Center.

\* cited by examiner

METHOD OF PERFORMING VARIANCE CALCULATIONS IN REAL-TIME FOR IN-SITU INSTANT VARIANCE MEASUREMENTS FOR LOW POWER APPLICATIONS

STATEMENT REGARDING FEDERALLY SPONSORED RESEARCH OR DEVELOPMENT

This invention was made with Government support under Government Contract NoN66001-02-C-8019 with DARPA as the Sponsoring Agency. The Government has certain rights in the invention.

BACKGROUND

When making measurements of time or frequency stability for performance of gyroscopes, accelerometers, precision frequency standards (atomic clocks), or their related integrated modules, one of the key measurements belongs to a family of time dependent algorithms most often referred to as the Allan variance or Allan deviation. Other members of this family of algorithms include the overlapping Allan variance, modified Allan variance, time variances, total Allan variance, total modified variance, Hadamard variance, overlapping Hadamard variance, total Hadamard variance, Theo1, and the like.

The time to perform a full Allan variance, Allan deviation, or the like, for all data points, grows exponentially with the number of data points (N) and generates a plot with N/2 averaging values. One solution to reduce processing time for the Allan variance, Allan deviation, or the like, is to calculate at discrete exponentially increasing averaging times (tau). This is done in factors of two (1, 2, 4, 8 . . . ) called octaves, ten (10 (decades)), or other methods, to limit the number of points calculated from N/2 down to tau values evenly spaced on a logarithmic x-axis.

These variance calculations are often performed post-measurement because regularly recalculating such equations can still be processor and memory intensive, and such equations can evolve and grow with each additional pair of data points. Thus, variance calculations are not used as much as they could be because of the large overhead of performing these calculations. As such, it would be difficult or at least not cost effective to implement variance calculations in a gyroscope, chip scale atomic clock, cold atom atomic clock, accelerometer, frequency reference, or any other time varying measurement using low power, miniaturized processors. The problem of making variance calculations in such devices is usually solved by using a single expensive test instrument, or via post-processing using an advanced math calculation software suite.

SUMMARY

A system for performing real-time variance analysis of data measurements comprises a data source, and a data processing unit in operative communication with the data source. The data processing unit is configured to receive data measurement values output from the data source and comprises at least one processer, and at least one memory device that operatively communicates with the processor. The memory device includes a processor readable medium having instructions executable by the processor for a real-time algorithm that performs variance calculations for the data measurement values. The real-time algorithm performs a process comprising:

a) initializing a data array for tracking a variance of individual data measurement values received from the data source, wherein each row number (k) of the data array is an increasing number for an averaging time (tau) defined by the equation tau=$dt(2^k)$, where dt is a sampling time between data measurement values, and wherein each column of the data array is a present value of an updated variable;

b) receiving a data measurement value from the data source;

c) determining a number of rows of the data array to be recalculated:
  (i) if there are no rows of the data array to be recalculated, recording the data measurement value to a first averaging position in the data array, and wait to receive a next data measurement value;
  (ii) if there are one or more rows of the data array to be recalculated, recalculating the one or more rows of the data array with updated averages of the data measurement values, and wait to receive the next data measurement value; and (d) repeating the process starting at (c) when the next data measurement value is received from the data source.

The data processing unit is configured to output real-time variance measurements based on the variance calculations for the data measurement values.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
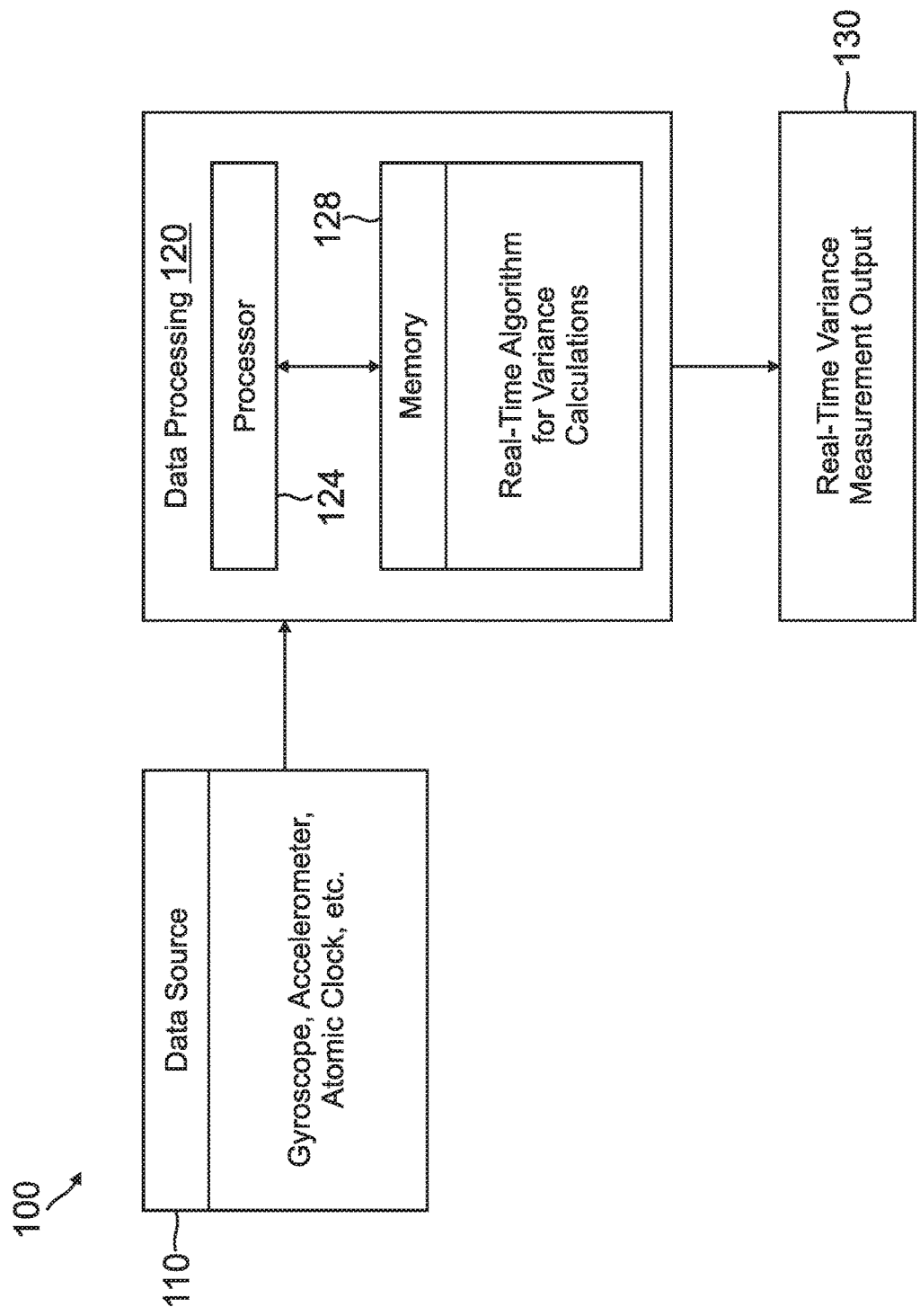
FIG. 1 is a block diagram of a system for performing real-time variance analysis of data measurements, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system is provided for performing time, frequency, velocity stability analysis, and other variance calculations in real-time, with low processing and memory overhead for in-situ instant variance measurements in low power applications. The present method and system implement a real-time algorithm that performs variance calculations for various data measurement values.

The present technique is based on calculations using two data points at "octaves" of the data point count, with data points that are not on the octaves being ignored. The present approach can perform the calculations with much lower overhead by re-using values previously calculated in the previous octave, and updating values only when needed. The present method holds the necessary information in registers at each octave and concatenates new values as needed. For example, the method only recalculates on octaves that are 1s in the binary representation of the sample count (number of data points taken). This operates down at the bit level of the count with masking and 1s and 0s being true and false. This is extremely fast bit-wise logic operating just above writing in machine code.

In the present method, higher octave levels get their values from the previous octave levels in a hierarchy. The method only receives two data points from the next octave down (typically referred to as the value of the previous Tau) to calculate a deviation, etc., no matter how many data points there are. The real-time algorithm does not need to retain any portion of the raw data except the last two immediate readings, the octave registers, and the count. This saves space as logged data uses memory proportional to the duration of a test.

In one implementation, the present method is used to perform Allan deviation signal stability calculations using a subset of total data points in a scheme that allows close to real-time indication of stability, which can be monitored during a stability test instead of having to post process the data after a test run. An advantage of the present approach is that the calculations can be performed using less processing power, and thus require less overhead. The present method also does not require saving of raw data, which allows near real-time monitoring of the data, giving nearly instantaneous results. This allows a user to avoid having to complete a long operational run before finding out that a device under test is not behaving properly.

The present technique is useful in any gyroscope product or another product containing a gyroscope; any accelerometer product or product containing an accelerometer; any frequency source product such as an atomic clock, crystal, chip scale atomic clock, cold atom atomic clock, or product containing such devices; any sensor, device, or instrument, which has time varying data and can use the Allan variance family of calculations to quantify the noise level and type over averaging time; and any part within an assembly whose performance may affect the performance of the above items (e.g., voltage reference stability used to control a voltage controlled oscillator (VCO)). The present approach can also be used in real-time analysis of guidance and navigation to determine stability of a gyroscope in guidance applications.

Time Domain Stability Analysis

The time domain stability analysis of a frequency, rate, acceleration, or other source is concerned with characterizing the variable y(t), which represents the quantity being measured. For instance, for a frequency stability, y(t) would be the fractional frequency. This is accomplished with an array of frequency, rate, or acceleration data, $y_i$, where the index i refers to data points equally-spaced in time. The data sampling or measurement interval Tau0 ($\tau 0$) typically has units of seconds. The analysis or averaging time Tau ($\tau$) may be a multiple of Tau0: $\tau 0$ ($\tau = m\tau 0$, where m is the averaging factor).

The purpose of stability analysis is an exact and complete, quantitative and standardized description of a data source, including nominal value, the fluctuations of that value, and its dependence on time. Statistical measures are used to characterize fluctuations of a data source. These are 2nd-moment measures of scatter, much like the standard variance used to quantify the variations around a nominal value. The variations from the mean (standard deviation, s) are squared, summed, and divided by the number of measurements-1. The standard variance ($s^2$) of a sample array of N data samples is represented by equation (1) as follows:

$$s^2 = \frac{1}{N-1} \sum_{i=1}^{N} (y_i - \bar{y})^2 \qquad (1)$$

Unfortunately, the standard variance values over time do not converge unless the noise source is white noise. Many devices such as clocks, gyroscopes, and accelerometers exhibit other types of noise such as flicker and random-walk noise, among others.

The Allan variance was developed to perform this analysis on data with white and non-white noise sources, and uses second differences of the variable rather than second differences of the mean. The Allan variance is convergent for most noise sources, and is represented by equation (2) as follows:

$$\sigma_y^2(\tau) = \frac{1}{2(M-1)} \sum_{i=0}^{M-1} (y_{i+1} - y_i)^2 \qquad (2)$$

Plotting the Allan variance against the averaging time ($\tau$) on a Log scale shows the dependence of stability on averaging time and is commonly used to describe the stability of a measurement. The Allan variance assumes the data to be analyzed is generated at a constant data rate. The time between measurements, dt, is the first value of tau (Tau0) in the Allan variance curve. Larger values of tau are multiples of the first tau (m*Tau0).

Certainty in the stability analysis can be improved by overlapping samples. This is not completely independent, but does increase the confidence. Equation (3) below shows how an overlapping Allan variance analysis is performed:

$$\sigma_y^2(\tau) = \frac{1}{2m^2(M-2m+1)} \sum_{j=1}^{M-2m+1} \sum_{i=j}^{j+m-1} (y_{i+m} - y_i) \qquad (3)$$

where M is the total number of measurements, and j is the count of overlapping sample groups calculated for a given tau value. Note that equation (3) includes nested loops, which leads to an exponential increase in analysis time for a proportional increase in data points.

The Allan variance is also referred to by the abbreviation AVAR in the instant description and drawings. The Allan deviation is the square root of the Allan variance. The Allan deviation is also referred to by the abbreviation ADEV in the instant description and drawings. The Allan deviation is also referred to as the "Root Allan Variance" with the abbreviation being RAV.

The present description assumes a first element index of zero, as is common in many programming languages (e.g., C, C++, Python, Java, PHP, and others). A first element index of 1 can also be used, and the relative changes in the present algorithm would be clear to anyone skilled in the art.

Real-Time Algorithm

The present approach provides a real-time algorithm that uses little memory, has a small code footprint, and gives instantaneous updates (every 2 data points) and real-time results that grow as the data set grows, without retaining the data set nor recalculating more than two data points for any value of Tau at a time. Each data point for a given value of Tau, is only recalculated when needed, reducing processing overhead even further. In addition, determining which values of tau require recalculation can be made purely by applying bitwise logic analysis on the binary format of the test point count.

Further details of the present approach are described hereafter with reference to the drawings.

FIG. 1 is a block diagram of a system 100 for performing real-time variance analysis for data measurements, according to one embodiment. The system 100 generally includes a data source 110, and a data processing unit 120 configured to receive data measurement values output from data source 110. The data source 110 can be one or more of a gyroscope, an accelerometer, an atomic clock, other frequency sources, or the like. The data processing unit 120 includes at least one processor 124 and at least one memory device 128 that operatively communicate with each other. The memory device 128 includes a processor readable medium having instructions executable by processor 124 for a real-time algorithm that performs variance calculations for the data measurement values. The real-time algorithm is described in further detail hereafter. The data processing unit 120 is configured to output real-time variance measurements (block 130) for further use as needed.

Figure 2:
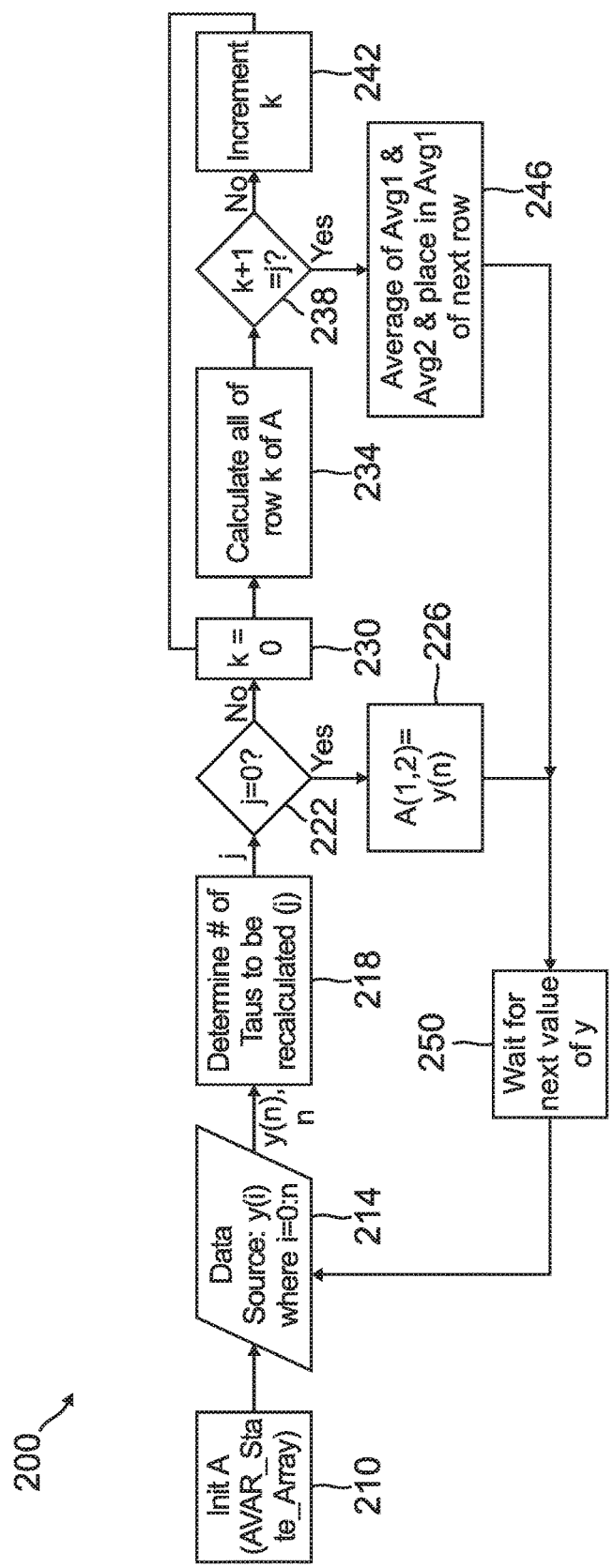
FIG. 2 is a flow diagram of a processing method for performing real-time variance analysis of data measurements according to one implementation.

FIG. 2 is a flow diagram of a processing method 200 for implementing the real-time algorithm according to the present approach. Unless otherwise stated, all counting and indexing starts at 0. The method 200 begins with an initialized state of the Allan variance array (Init A (AVAR_STATE_ARRAY)) (block 210). This step is the initialization of the array that will track the Allan variance for each Tau value and all the supporting pre-calculation values. The structure of this array (A) is shown in Table 1 below, with the initialization procedure described thereafter. The parameter dt in Table 1 is the time step between measurements or data points, typically in seconds, and often in 1 second increments. In this array, each row number (k) is an increasing Tau value and each column is the present value of an updated variable.

TABLE 1

| | | | | Column: | | | |
|---|---|---|---|---|---|---|---|
| 0 | 1 | 2 | 3 | 4 | 5 | 6 | 7 |
| k | Tau = dt * $2^k$ | Avg 1 | Avg 2 | Sum_Sigma_Sq | Sum_Count | AVAR | ADEV |
| 0 | 1 | 0 | 0 | 0 | 0 | 0 | 0 |
| 1 | 2 | 0 | 0 | 0 | 0 | 0 | 0 |
| 2 | 4 | 0 | 0 | 0 | 0 | 0 | 0 |
| 3 | 8 | 0 | 0 | 0 | 0 | 0 | 0 |
| 4 | 16 | 0 | 0 | 0 | 0 | 0 | 0 |
| 5 | 32 | 0 | 0 | 0 | 0 | 0 | 0 |
| . | . | . | . | . | . | . | . |
| . | . | . | . | . | . | . | . |
| . | . | . | . | . | . | . | . |
| n | dt * $2^n$ | 0 | 0 | 0 | 0 | 0 | 0 |

Columns 0 and 1 of Table 1 can be calculated in advance. Columns 6 or 7 do not need to be calculated unless the user needs the Allan variance (AVAR) and/or the Allan deviation (ADEV). The equations to determine each column value of array A for a given row, k, in Table 1 is set forth below in Table 2.

TABLE 2

| | |
|---|---|
| Column 0 - Row Number | $A(k, 0) = k$ |
| Column 1 - Tau Value | $A(k, 1) = dt * \text{Tau} = 2^{A(k, 0)}$ |
| Column 2 - Average 1 | $A(k, 2) = Avg_1(k)$ |
| Column 3 - Average 2 | $A(k, 3) = Avg_2(k)$ |
| Column 4 - Sum Sigma Squared | $A(k, 4) = \text{Sum\_Sigma\_Sq}(k) + (Avg_2 - Avg_1)^2$ |
| Column 5 - Sum Sigma Count | $A(k, 5) = \text{Sum\_Count}(k) + 1$ |
| Column 6 - AVAR | $A(k, 6) = \text{Sum\_Sigma\_Sq}(k) / \text{Sum\_Count}(k)$ |
| Column 7 - ADEV | $A(k, 7) = [AVAR(k)]^{1/2}$ |

Once the array is initialized, method 200 waits for a first data point (y1) from a data source (y(i), where i=0:n) (block 214), which is the source of the data that is being processed. Data from the data source is typically received at a constant update rate (dt), for example, 1 sample per second (1 samp/s).

Often the data is a measurement and typically the value is a time stability measurement, such as frequency, and cycle or period; or a motion/navigation measurement, such as velocity and acceleration. In exemplary embodiments, the data source can be the output of a frequency counter, rate of a gyroscope, or output of an accelerometer.

Data (y) at a given time interval is numbered with subscripts of increasing values (steps of 1) to designate which data point it is: $y_0$ is the first data point, pronounced "y sub zero"; $y_1$ is the second point, pronounced "y sub one"; $y_n$ represents an undefined value in the future and is data point n. Note that this explanation assumes a first element index of zero as is common in many programming languages (e.g., c, c++, python, java, php, and others). A first element index of 1 is also common in other programming languages (e.g., Basic, CFML, Matlab, and others).

The method 200 then determines the number of Tau values to be recalculated (block 218). Based on the data point number n, the algorithm determines which Tau values of the Allan variance should be updated. These are always incremented from Tau0 to Tauj, where j is the number of Tau values to be recalculated. After each new data point, the algorithm automatically determines how many rows of the array need to be recalculated to update the values. This can be a value of 0 (none) and above.

In one exemplary method, n is the count of all data points at this point (decimal); 0bn is the binary representation of n. The number of rows (Tau values) to fill in the array is equal to the number of consecutive ones of 0bn starting from the least significant bit (LSB) and moving to the most significant bit (MSB). For example, if n=7, then 0bn=00111. Starting at LSB (far right one) and moving left, the number of consecutive ones is 3. Therefore, processing will only be done on the first 3 Tau values. In another example, if n=8, then 0bn=01000. The number is even, so the value of $y_8$ is just stored in the first mean value (µ1). In a further example, if n=9, then 0bn=01001. Starting at LSB (far right one) and moving left, the number of consecutive ones is 1. Therefore, processing will only be done on the first Tau value. Other methods that facilitate this calculation include embedded loops, recursive functions, and look up tables (LUTs).

The method 200 next determines whether j=0 (block 222). If yes, then n is an even number and the data point is recorded to the first averaging position for Tau0: A(1,2)=y(n) (block 226). If the Tau value does not equal zero, then one or more rows of the array must be re-calculated with updated averages. The variable k represents the count of the particular row starting at row=0 (k=0) (block 230).

The method 200 then calculates all the column values of a row k in the array A (block 234). Example equations for this step are as follows:

$A(k,3)=y(n)$ for $k=0$, else average of previous row's $Avg_1$ and $Avg_2$: $A(k-1,2)$ and $A(k-1,3)$;

$A(k,4)$=Sum_Sigma_Sq=Sum_Sigma_Sq+$(Avg_2-Avg_1)^2$;

$A(k,5)$=Sum Count=Sum Count+1;

Optional equations for when the Allan variance and Allan deviation are used include:

$A(k,6)$=AVAR=$A(k,4)/A(k,5)$;

$A(k,7)$=ADEV=$[A(k,6)]^{1/2}$.

After calculating all the columns in array A, method 200 determines whether all the values for Tau have been recalculated based on the value of j previously determined (k+1=j?) (block 238); if not, method 200 moves to the next row by incrementing k (k=k+1) (block 242), and the next row is recalculated as discussed above (block 234); if yes (k+1=j), then method 200 seeds the first average (Avg1) of the next row, with the next value for Tau, which is the average of Avg1 and Avg2 from the previous row (block 246). One method to calculate the average of $Avg_1$ and $Avg_2$ of row k uses the following equation:

$A(k+1,2)=[A(k,2)+A(k,3)]/2$

If the sums are represented by an integer, they can be added together and bit shifted right. This is not extremely accurate, but decreases processing time.

After seeding Avg1 of the next row, method 200 waits for the next data point value from the data source (block 250). When the next data point value is received, method 200 is repeated starting at block 214.

In an alternate implementation, Avg1 and Avg2 (first and second averages described in the array A) can each be represented by two columns: a sum and a count, with the average being determined when calculating the difference of squares. This implementation takes up a little more memory, but helps minimize errors in calculated values due to cascading floating point operations. This offers the advantage that successive averages are not subject to accuracy degradation from the repeated dividing of floating point numbers. Many measurements are made using analog to digital converters, ADCs, which report values as integers. Complete accuracy would be retained with the sums and counts remaining as integers. On the other hand, if the sums are represented by an integer, they can be added together and bit shifted 1 position right for the divide by 2. This is not extremely accurate, but reduces processing time.

Figure 3:
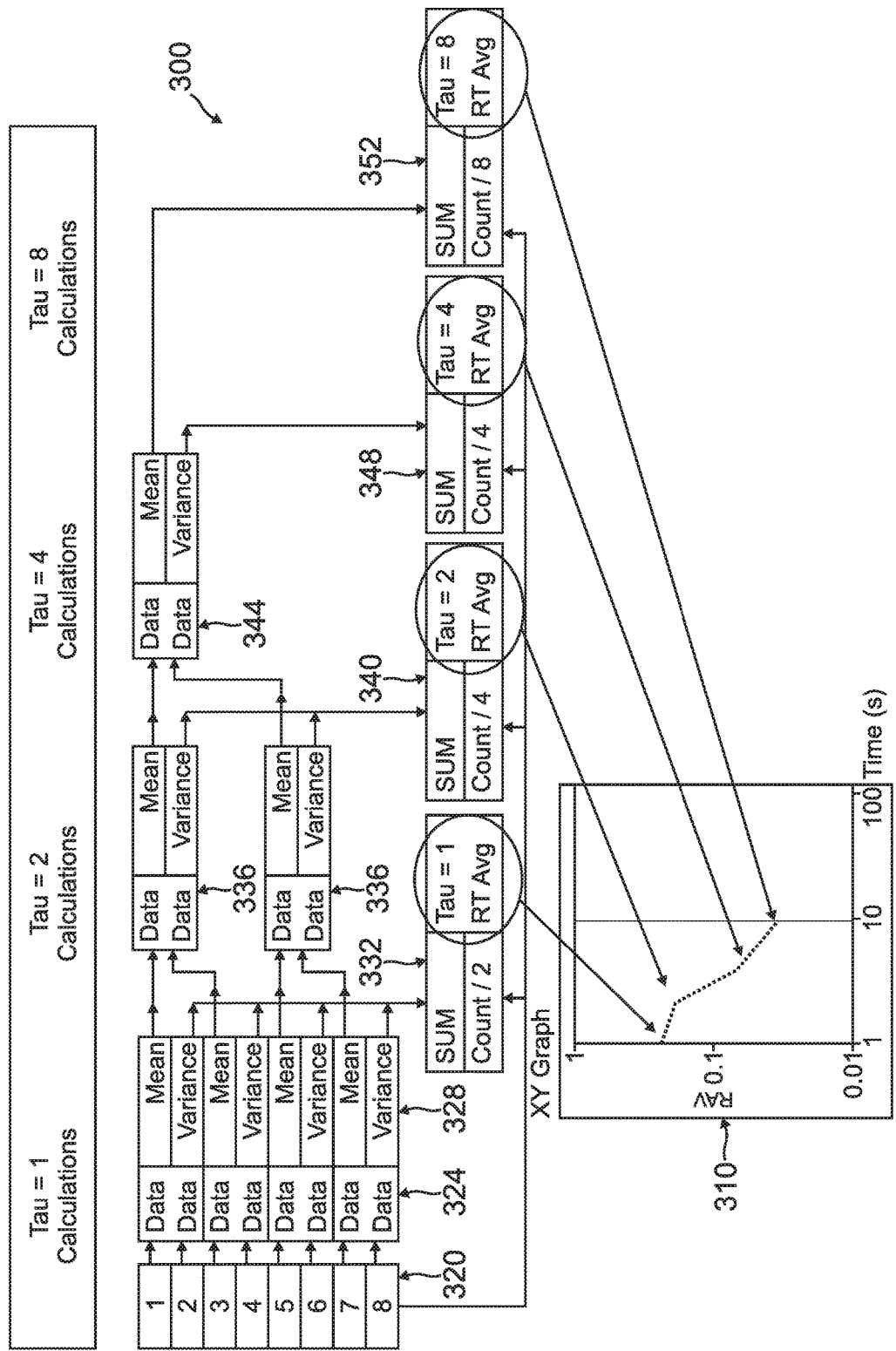
FIG. 3 is a flow diagram of an example real-time algorithm for a second order system using eight data points, and an associated data plot graph.

FIG. 3 is a flow diagram of an example real-time algorithm 300 for a second order system using eight data points, and an associated data plot graph 310. The eight data points give four points on a RAV curve shown in data plot graph 310. The left column 320 is the time step. Each time step generates a data point labeled "Data" (block 324). A function finds the mean and standard variance of each pair of consecutive data points (block 328). The variance is added to a running sum of every two data points (block 332). That sum is divided by the number of variance readings from a running count to give the Allan variance for Tau=1. The square root of this Allan variance is the Allan deviation (root Allan variance or RAV). When the next two data points arrive, the variance is added to the running sum. The sum is divided by the new count for a new Allan variance and square rooted for the new Allan deviation. The RAV for Tau=1 is now refined and will be updated in real-time every two data points.

To calculate Tau=2 RAV, the next column of calculations is considered (block 336). The variance is calculated from the two means from four data points. These variances are summed, divided by the count of four, and square rooted for the Tau=2 RAV (block 340). It should be noted that this item will be updated/refined every four data points. Similarly, Tau=4 RAV is calculated using the means from the Tau=2 calculations (block 344). These variances are summed, divided by the count of four, and square rooted for the Tau=4 RAV (block 348). This value is updated every eight data points. Likewise, Tau=8 RAV is calculated using the mean from the Tau=4 calculations (block 352). More Tau values can be generated by taking more data points and adding more loops.

The real-time algorithm described above with respect to FIG. 2 was implemented in LabVIEW using nested FOR loops in one example. Each FOR loop is a Tau point starting from the inside and working out. The number of times the FOR loop increments determines the order of the RAV analysis. In this example, 11 nested FOR loops were used. For a second order RAV, this will take up to 2048 data points. With a 1 second update rate, the run time was about 34 minutes. More loops can be added if a longer run time is needed.

Figure 4:
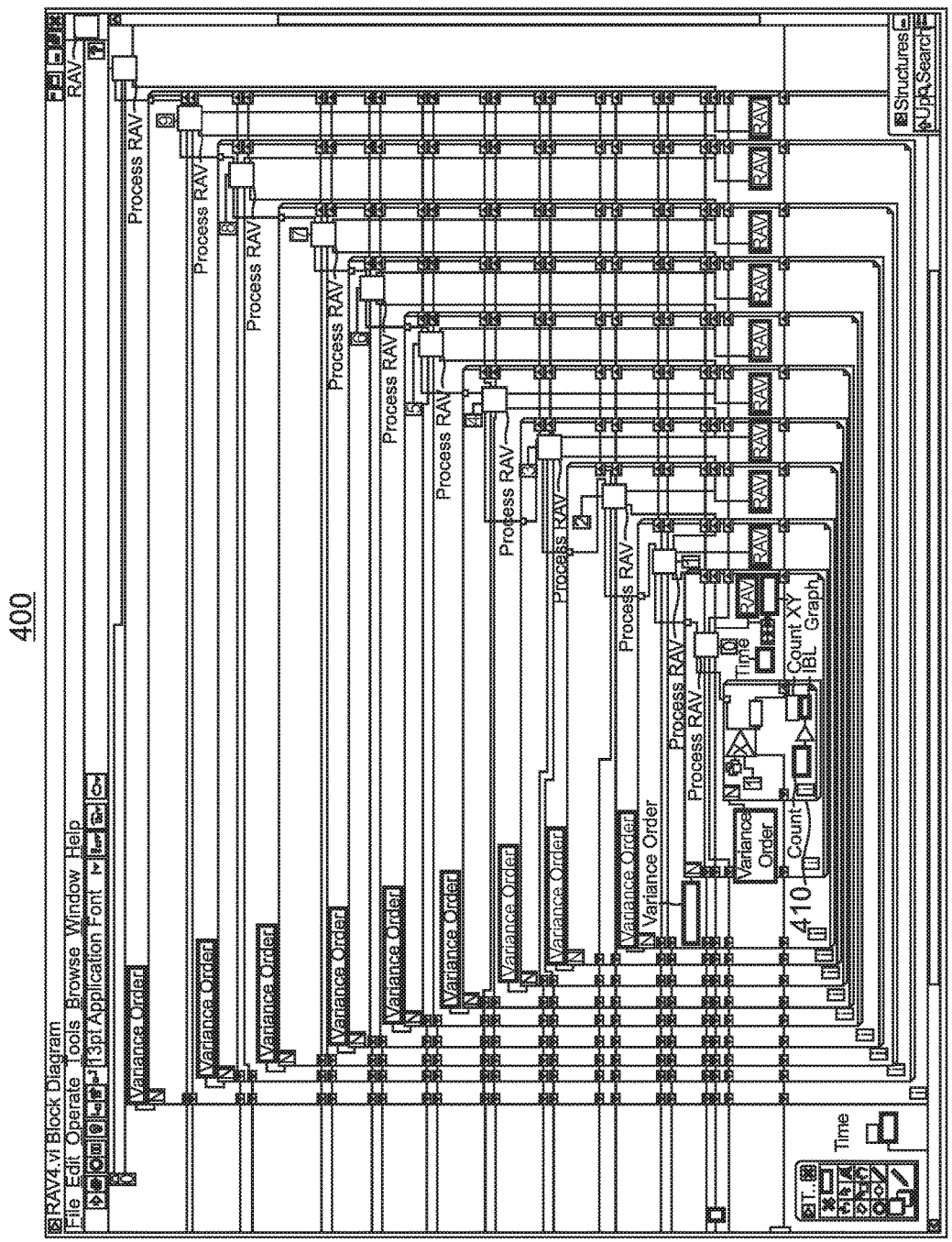
FIG. 4 is a screen view of a section of a LabVIEW block diagram showing eleven nested loops around the data source and the main processing algorithm for performing real-time variance analysis of data measurements.

FIG. 4 is a screen view 400 of the main section of a LabVIEW block diagram (code) for the program running the real-time algorithm. The 11 nested FOR loops and many shift registers to flow data through the loops are visible, with a data source 410 at the core. The boxes in the block diagram are functions that perform different aspects of the functional blocks in FIG. 2. A random number generator can replace the data source to test the algorithm without needing a data source.

Figure 5:
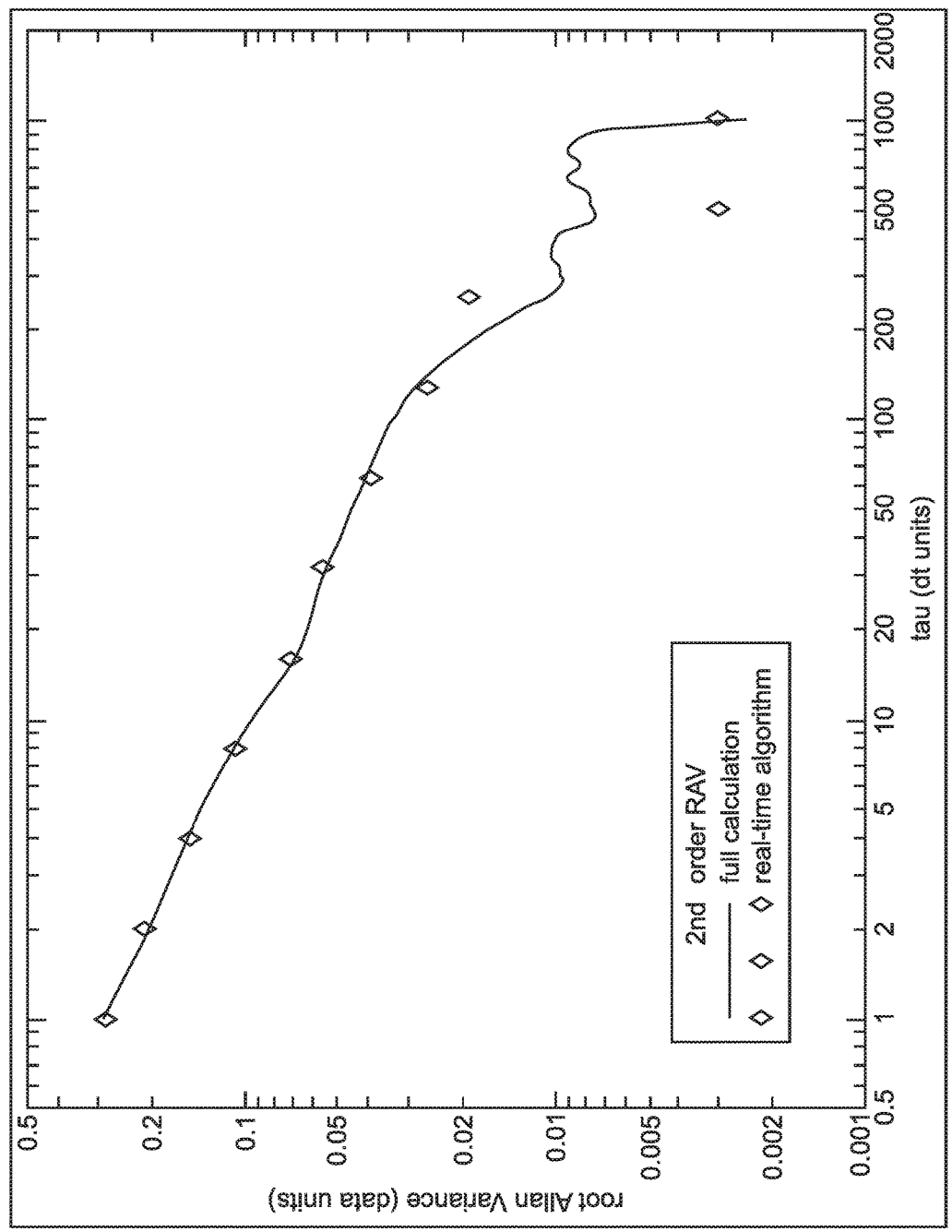
FIG. 5 is a graph showing real-time calculation results versus a full calculation on a $2^{nd}$ order data set.

FIG. 5 is a graph of the root Allan variance (data units) with respect to tau (dt units), showing the results of a full calculation on a $2^{nd}$ order data set compared with using the real-time algorithm implemented as described with respect to FIG. 4 for a 2048 point dataset. The solid line shows the results using a more thorough post process overlapping Allan deviation. The overlapping Allan deviation calculates many of the intermediate points and also does some redundant averaging and other techniques to improve certainty of each point. The real-time RAV does an excellent job of fitting the curve in real-time.

In the present approach, where the Allan variance is always between two values, the standard variance can be substituted for the Allan variance and the standard deviation can be substituted for the Allan deviation. This is because equations (1) and (2) are equal when only calculating two data points. The derivation showing that Allan variance can be calculated using standard variance when only processing two data points is set forth as follows:

Standard Variance (SVAR):

$$\sigma^2 = 1/(N-1)\Sigma(y_i - y_m)^2$$

for i=1 to N, where N=2,
$y_m$ is the mean of ally values: $(y_1+y_2)/2$, $$\sigma^2 = [y_1 - (y_1+y_2)/2]^2 [y_2 - (y_2+y_2)/2]^2,$$

$$\sigma^2 = [2y_1/2 - (y_1+y_2)/2]^2 + [2y_2/2 - (y_1+y_2)/2]^2,$$

$$\sigma^2 = [(2y_1-y_1-y_2)/2]^2 + [(2y_2-y_1-y_2)/2]^2,$$

$$\sigma^2 = [(y_1-y_2)/2]^2 + [(y_2-y_1)/2]^2,$$

$$\sigma^2 = \frac{1}{4}[(y_1-y_2)^2 + (y_2-y_1)^2],$$

Since $(a-b)^2 = (b-a)^2$, $\sigma^2 = \frac{1}{4}[2(y_2-y_1)^2]$, and $\sigma^2 = \frac{1}{2}(y_2-y_1)^2$.

Allan Variance (AVAR):

$$\sigma_A^2 = 1/[2(M-1)]\Sigma(y_{i+2}-y_i)^2$$

for i=1 to M-1, where M=2, $$\sigma_A^2 = \frac{1}{2}(y_2-y_1)^2,$$

$\sigma^2 = \sigma_A^2$, and therefore: $\sigma = \sigma_A$.

As the Allan deviation used in the present approach is always between two values, this can be simplified to a subtraction multiplied by a constant. If only the Allan deviation is needed, then the math reduces significantly for faster processing. The derivation showing than Allan deviation (ADEV) can be simplified to reduce processing time is set forth as follows:

$$\sigma_A^2 = \sigma^2 = \frac{1}{2}(y_2-y_1)^2$$

therefore, $$\sigma_A = \sigma = [\frac{1}{2}(y_2-y_1)^2]^{1/2},$$

$$\sigma_A = \sigma = (\frac{1}{2})^{1/2}|y_2-y_1|,$$

if constant $c = (\frac{1}{2})^{1/2}$, $\sigma_A = c|y_2-y_1|$.

The Allan deviation or root Allan variance is a constant times the absolute value of the two points subtracted. What was once a math intensive calculation involving a subtraction, (M-1) squares, (M-1) additions, and a multiplication, reduces to a subtraction, absolute value, and multiplication by a constant.

When the Allan deviation is used in a lower processing alternative version of the present approach, the initialized array A (A(k,col)=ADEV_State_Array) can be updated as shown in Table 3.

TABLE 3

| | | Column: | | |
|---|---|---|---|---|
| 0 | 1 | 2 | 3 | 4 |
| k | Tau = dt * $2^k$ | μ1(k) | μ2(k) | ADEV |
| 0 | 1 | 0 | 0 | 0 |
| 1 | 2 | 0 | 0 | 0 |
| 2 | 4 | 0 | 0 | 0 |

TABLE 3-continued

| | | Column: | | |
|---|---|---|---|---|
| 0 | 1 | 2 | 3 | 4 |
| k | Tau = dt * $2^k$ | μ1(k) | μ2(k) | ADEV |
| 3 | 8 | 0 | 0 | 0 |
| 4 | 16 | 0 | 0 | 0 |
| 5 | 32 | 0 | 0 | 0 |
| . | . | . | . | . |
| . | . | . | . | . |
| . | . | . | . | . |
| n | dt * $2^n$ | 0 | 0 | 0 |

In the array of Table 3, each row number (k) is an increasing tau value and each column is the present value of a variable updated per the equations below:

Column2−Sum1: $A(k,2) = \text{Avg}_1(k)$

Column3−Sum2: $A(k,3) = \text{Avg}_2(k)$

Column4−ADEV: $A(k,7) = \text{ADEV}(k)$

The 0 and 1 columns of Table 3 are pre-calculated and so do not change after initialization. The equations used in calculating variables in each row k of the array are as follows:
A(k,3)=
y(n) for k=0, else
average of previous row's $\text{Avg}_1$ and $\text{Avg}_2$: A(k−1,2)+A(k−1,3), and optionally:
A(k,4)=ADEV=c|$\text{Avg}_2 - \text{Avg}_1$|
where constant $c = (\frac{1}{2})^{1/2}$ In other words, updated variables comprising the standard deviation can be calculated by taking the absolute value of the difference of the updated averages of the data measurement, and multiplying the absolute value by the constant comprising one half to the power of one half. It should be noted that one half to the power of one half is the same as the square root of ½, or the square root of 2 divided 2.

The present technique has various advantages and benefits. For example, with each two new data points coming off an instrument or other device, all data points in the set that need to be re-calculated are recalculated. Data points already present are refined and new data points are added. In addition, the present approach allows fast calculations to be performed. Each value for Tau is determined based on values derived from the values generated for the previous Tau value (Tau/2). This reuse of calculations significantly reduces the number of floating point operations (flops) needed to calculate the Allan variance at a given value for Tau. Traditionally, every two data points of the entire dataset would need to be re-evaluated, but that is not the case for the present algorithm, which instead, uses a running sum of squared differences so previous data points are not retained. For every two data points, the Allan variance of only some values for Tau need to be recalculated. The present approach can use several fast processing ways to determine which values for Tau require the Allan variance to be recalculated, including bit-wise analysis of the count, nested loops, recursive functions, and look-up tables (LUTs).

In addition, the present approach has the advantage that there are no large arrays being moved in memory that include all the raw data. Each time value (Tau) on the curve has two means, sum, and count (4 scalar variables). For example, for 11 values for Tau, that is only an array of 11×4, which equals 44 variables being updated. Further, an additional Allan variation or standard deviation can also be calculated, and the order of the Allan variance can be set from two (standard) to whatever is desired. (The order is the number of data points that are used to determine the variance.)

The present algorithm is easily implemented in a variety of programming environments including C, Matlab, or LabVIEW, and post-processing is not required. The algorithm also allows a user to make changes in-situ and immediately see the effects of noise level in a short time with increasing accuracy with time.

A computer or processor used in the present system and method can be implemented using software, firmware, hardware, or any appropriate combination thereof, as known to one skilled in the art. By way of example and not limitation, hardware components can include one or more microprocessors, memory elements, digital signal processing (DSP) elements, interface cards, and other standard components known in the art. These may be supplemented by, or incorporated in, specially-designed application-specific integrated circuits (ASICs), field programmable gate arrays (FPGAs), or complex programmable logic devices (CPLDs). The computer or processor can also include functions with software programs, firmware, or other computer readable instructions for carrying out various process tasks, calculations, and control functions used in the present method and system.

The present method can be implemented by computer executable instructions, such as program modules or components, which are executed by at least one processor. Generally, program modules include routines, programs, objects, data components, data structures, algorithms, and the like, which perform particular tasks or implement particular data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable computer readable media may include storage or memory media such as magnetic or optical media. For example, storage or memory media may include conventional hard disks, Compact Disk-Read Only Memory (CD-ROM), DVDs, volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), and the like), Read Only Memory (ROM), Electrically Erasable Programmable ROM (EEPROM), flash memory, Blu-ray discs, and the like. Combinations of the above are also included within the scope of computer readable media.

Example Embodiments

Example 1 includes a system for performing real-time variance analysis of data measurements, the system comprising: a data source; and a data processing unit in operative communication with the data source, the data processing unit configured to receive data measurement values output from the data source, the data processing unit comprising: at least one processer; and at least one memory device that operatively communicates with the at least one processor, the memory device including a processor readable medium having instructions executable by the at least one processor for a real-time algorithm that performs variance calculations for the data measurement values by a process comprising: (a) initializing a data array (A) for tracking a variance of individual data measurement values received from the data source, wherein each row number (k) of the data array is an increasing number for an averaging time (tau) defined by the equation tau=dt($2^k$), where d t is a sampling time between data measurement values, wherein each column of the data array is a present value of an updated variable; (b) receiving a data measurement value from the data source; (c) determining a number of rows of the data array to be recalculated: (i) if there are no rows of the data array to be recalculated, recording the data measurement value to a first averaging position in the data array, and wait to receive a next data measurement value; (ii) if there are one or more rows of the data array to be recalculated, recalculating the one or more rows of the data array with updated averages of the data measurement values, and wait to receive the next data measurement value; and (d) repeating the process starting at (c) when the next data measurement value is received from the data source; wherein the data processing unit is configured to output real-time variance measurements based on the variance calculations for the data measurement values.

Example 2 includes the system of Example 1, wherein the data source comprises a gyroscope, or a product assembly comprising at least one gyroscope.

Example 3 includes the system of Example 1, wherein the data source comprises an accelerometer, or a product assembly comprising at least one accelerometer.

Example 4 includes the system of Example 1, wherein the data source comprises a frequency source, or a product assembly comprising at least one frequency source.

Example 5 includes the system of Example 4, wherein the frequency source comprises an atomic clock, a crystal, a chip scale atomic clock, or a cold atom atomic clock.

Example 6 includes the system of any of Examples 1-5, wherein the present value of the updated variable comprises an Allan variance, or an Allan deviation.

Example 7 includes the system of any of Examples 1-5, wherein the present value of the updated variable comprises a standard variance, or a standard deviation.

Example 8 includes the system of Example 7, wherein the updated variable comprising the standard deviation is calculated by taking the absolute value of the difference of the updated averages of the data measurement values, and multiplying the absolute value by a constant comprising one half to the power of one half.

Example 9 includes the system of any of Examples 1-8, wherein determining the number of rows of the data array to be recalculated comprises: applying bitwise logic analysis on a binary format of a test point count; using one or more look up tables; applying a nested loop algorithm; or applying one or more recursive functions.

Example 10 includes the system of any of Examples 1-9, wherein the first averaging position and subsequent averaging positions in the data array are represented by two columns in the data array comprising a sum and a count, thereby retaining accuracy by not introducing floating point divide by errors at each higher tau value.

Example 11 includes a method for real-time variance analysis of data measurements, the method comprising: receiving a plurality of data measurement values separated by a sampling time period from a data source; determining a first mean and a first variance for each pair of consecutive data measurement values; adding the first variance for each pair of consecutive data measurement values to a first running sum; dividing the first running sum by a first running count of each data measurement value, to give an Allan variance for a first averaging time; for each two pairs of consecutive data measurement values, determining a second mean and a second variance based on the first mean for each pair of consecutive data measurement values; adding the second variance for each of the two pairs of consecutive data measurement values to a second running sum; and dividing the second running sum by a second running count of each pair of consecutive data measurement values, to give an Allan variance for a second averaging time.

Example 12 includes the method of Example 11, wherein the data source comprises a gyroscope, or a product assembly comprising at least one gyroscope.

Example 13 includes the method of Example 11, wherein the data source comprises an accelerometer, or a product assembly comprising at least one accelerometer.

Example 14 includes the method of Example 11, wherein the data source comprises a frequency source, or a product assembly comprising at least one frequency source.

Example 15 includes the method of Example 14, wherein the frequency source comprises an atomic clock, a crystal, a chip scale atomic clock, or a cold atom atomic clock.

Example 16 includes a computer program product, comprising: a non-transitory computer readable medium including instructions executable by a processor to perform a method for real-time variance analysis of data measurements, the method comprising: receiving a plurality of data measurement values separated by a sampling time period from a data source; determining a first mean and a first variance for each pair of consecutive data measurement values; adding the first variance for each pair of consecutive data measurement values to a first running sum; dividing the first running sum by a first running count of each data measurement value, to give an Allan variance for a first averaging time; for each two pairs of consecutive data measurement values, determining a second mean and a second variance based on the first mean for each pair of consecutive data measurement values; adding the second variance for each of the two pairs of consecutive data measurement values to a second running sum; and dividing the second running sum by a second running count of each pair of consecutive data measurement values, to give an Allan variance for a second averaging time.

Example 17 includes the computer program product of Example 16, wherein the data source for the data measurement values comprises a gyroscope, or a product assembly comprising at least one gyroscope.

Example 18 includes the computer program product of Example 16, wherein the data source for the data measurement values comprises an accelerometer, or a product assembly comprising at least one accelerometer.

Example 19 includes the computer program product of Example 16, wherein the data source for the data measurement values comprises a frequency source, or a product assembly comprising at least one frequency source.

Example 20 includes the computer program product of Example 19, wherein the frequency source comprises an atomic clock, a crystal, a chip scale atomic clock, or a cold atom atomic clock.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for performing real-time variance analysis of data measurements, the system comprising:
   a data source; and
   a data processing unit in operative communication with the data source, the data processing unit configured to receive data measurement values output from the data source, the data processing unit comprising:
   at least one processer; and
   at least one memory device that operatively communicates with the at least one processor, the memory device including a processor readable medium having instructions executable by the at least one processor for a real-time algorithm that performs variance calculations for the data measurement values by a process comprising:
   (a) initializing a data array for tracking a variance of individual data measurement values received from the data source, wherein each row number (k) of the data array is an increasing number for an averaging time (tau) defined by the equation tau=dt($2^k$), where dt is a sampling time between data measurement values, wherein each column of the data array is a present value of an updated variable;
   (b) receiving a data measurement value from the data source;
   (c) determining a number of rows of the data array to be recalculated:
      (i) if there are no rows of the data array to be recalculated, recording the data measurement value to a first averaging position in the data array, and wait to receive a next data measurement value;
      (ii) if there are one or more rows of the data array to be recalculated, recalculating the one or more rows of the data array with updated averages of the data measurement values, and wait to receive the next data measurement value; and
   (d) repeating the process starting at (c) when the next data measurement value is received from the data source;
   wherein the data processing unit is configured to output real-time variance measurements based on the variance calculations for the data measurement values.

2. The system of claim 1, wherein the data source comprises a gyroscope, or a product assembly comprising at least one gyroscope.

3. The system of claim 1, wherein the data source comprises an accelerometer, or a product assembly comprising at least one accelerometer.

4. The system of claim 1, wherein the data source comprises a frequency source, or a product assembly comprising at least one frequency source.

5. The system of claim 4, wherein the frequency source comprises an atomic clock, a crystal, a chip scale atomic clock, or a cold atom atomic clock.

6. The system of claim 1, wherein the present value of the updated variable comprises an Allan variance, or an Allan deviation.

7. The system of claim 1, wherein the present value of the updated variable comprises a standard variance, or a standard deviation.

8. The system of claim 7, wherein the updated variable comprising the standard deviation is calculated by taking the absolute value of the difference of the updated averages of the data measurement values, and multiplying the absolute value by a constant comprising one half to the power of one half.

9. The system of claim 1, wherein determining the number of rows of the data array to be recalculated comprises:
  applying bitwise logic analysis on a binary format of a test point count;
  using one or more look up tables;
  applying a nested loop algorithm; or
  applying one or more recursive functions.

10. The system of claim 1, wherein the first averaging position and subsequent averaging positions in the data array are represented by two columns in the data array comprising a sum and a count, thereby retaining accuracy by not introducing floating point divide by errors at each higher tau value.

11. A method for performing real-time variance analysis of data measurements, the method comprising:
  providing a data processing unit in operative communication with a data source, the data processing unit configured to receive data measurement values output from the data source;
  performing variance calculations for the data measurement values in the data processing unit by a process comprising:
    (a) initializing a data array for tracking a variance of individual data measurement values received from the data source, wherein each row number (k) of the data array is an increasing number for an averaging time (tau) defined by the equation tau=dt($2^k$), where dt is a sampling time between data measurement values, wherein each column of the data array is a present value of an updated variable;
    (b) receiving a data measurement value from the data source;
    (c) determining a number of rows of the data array to be recalculated:
      (i) if there are no rows of the data array to be recalculated, recording the data measurement value to a first averaging position in the data array, and wait to receive a next data measurement value;
      (ii) if there are one or more rows of the data array to be recalculated, recalculating the one or more rows of the data array with updated averages of the data measurement values, and wait to receive the next data measurement value; and
    (d) repeating the process starting at (c) when the next data measurement value is received from the data source; and
  outputting real-time variance measurements from the data processing unit based on the variance calculations for the data measurement values.

12. The method of claim 11, wherein the data source comprises a gyroscope, or a product assembly comprising at least one gyroscope.

13. The method of claim 11, wherein the data source comprises an accelerometer, or a product assembly comprising at least one accelerometer.

14. The method of claim 11, wherein the data source comprises a frequency source, or a product assembly comprising at least one frequency source.

15. The method of claim 11, wherein the present value of the updated variable comprises an Allan variance, or an Allan deviation.

16. The method of claim 11, wherein the present value of the updated variable comprises a standard variance, or a standard deviation.

17. The method of claim 16, wherein the updated variable comprising the standard deviation is calculated by taking the absolute value of the difference of the updated averages of the data measurement values, and multiplying the absolute value by a constant comprising one half to the power of one half.

18. The method of claim 11, wherein determining the number of rows of the data array to be recalculated comprises:
  applying bitwise logic analysis on a binary format of a test point count;
  using one or more look up tables;
  applying a nested loop algorithm; or
  applying one or more recursive functions.

19. The method of claim 11, wherein the first averaging position and subsequent averaging positions in the data array are represented by two columns in the data array comprising a sum and a count, thereby retaining accuracy by not introducing floating point divide by errors at each higher tau value.

20. A computer program product, comprising:
  a non-transitory computer readable medium including processor executable instructions to perform a method for real-time variance analysis of data measurements, the method comprising:
    performing variance calculations for data measurement values, received by a data processing unit from a data source, by a process comprising:
      (a) initializing a data array for tracking a variance of individual data measurement values received from the data source, wherein each row number (k) of the data array is an increasing number for an averaging time (tau) defined by the equation tau=dt($2^k$), where dt is a sampling time between data measurement values, wherein each column of the data array is a present value of an updated variable;
      (b) receiving a data measurement value from the data source;
      (c) determining a number of rows of the data array to be recalculated:
        (i) if there are no rows of the data array to be recalculated, recording the data measurement value to a first averaging position in the data array, and wait to receive a next data measurement value;
        (ii) if there are one or more rows of the data array to be recalculated, recalculating the one or more rows of the data array with updated averages of the data measurement values, and wait to receive the next data measurement value; and
      (d) repeating the process starting at (c) when the next data measurement value is received from the data source; and
    outputting real-time variance measurements from the data processing unit based on the variance calculations for the data measurement values.

* * * * *